UNITED STATES PATENT OFFICE.

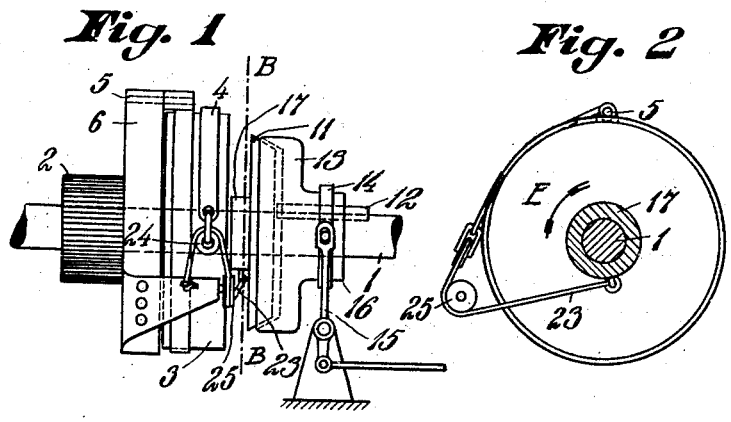

PAUL WILHELM SIEURIN, OF GOTTENBORG, SWEDEN.

FRICTION-COUPLING.

1,368,361.  Specification of Letters Patent.  Patented Feb. 15, 1921.

Application filed February 6, 1917. Serial No. 146,969.

*To all whom it may concern:*

Be it known that I, PAUL WILHELM SIEURIN, a subject of the King of Sweden, and resident of Lilla Torget 6, Gottenborg, Sweden, have invented certain new and useful Improvements in Friction-Couplings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a friction coupling in which the force of friction required for the coupling is produced chiefly by the device that a brake band, cable, or the like member, which can be tightened in a suitable manner, is brought into friction against a driving cylinder, disk, drum, or the like machine part, from which the force is transmitted to the driven part.

The invention is characterized mainly by the fact that the parts which bring about the coupling consist of brake cylinder, disk, or the like machine part, and a brake device coöperating with the same, which device may consist of a band, chain, cable, or the like machine part, with or without friction clutches.

On the accompanying drawing is shown one form of the invention, Figure 1 illustrating said form viewed from the side, and Fig. 2 a section along the line B—B in Fig. 1.

In the form of the invention here shown, —1— designates the driving shaft, and —2— the part which is to be coupled with the shaft —1—, and which part is freely journaled on the said shaft. On the latter is firmly journaled a brake cylinder, disk, drum, or the like, around which is laid a band —4—, one end of which by means of a pin —5— or other connection is indirectly rotatably connected with the driven part —2—, owing to the fact that the end of the band is fastened by means of the pin —5— to a wheel —6— firmly connected with the part —2—. If pull is now exerted on the other end of the band, the band —4— is brought close up to the disk or machine part —3— driven by the shaft, whereby, if the friction is sufficient, the part —2— is set in rotation.

In order to be enabled to effect the said pull on the band so that the latter is brought close up to the friction disk —3—, this form of construction is provided with a tension device for the brake band, which device consists of a cable, chain, or the like, —23—, attached to the part —6— firmly connected with the part —2—, and running over a pulley —24— mounted on one end of the band —4— and a pulley 25 journaled in the part —6—, and which cable —23— is attached to the nave —17— of a friction disk —11—. On the shaft —1— is arranged longitudinally displaceably but not rotatably, by means of a key —12— a conical clutch disk —13—, coöperating with the disk —11—, which disk —13— by means of a ring —14— running in a circular opening in the nave —16— of the said disk —13— and a furcated lever —15— acting on the said ring in the well-known manner, can be moved into and out of engagement with the disk —11—.

On the rotation of the shaft —1—, and of the disk —11— coupled together with it, in the direction indicated by the arrow —E— in Fig. 2, the cable is wound up on the nave —17—, whereby a pull is effected in the cable, etc., and the band —4— is drawn taut, thereby bringing about a coupling between the disk —3— and the part —6—.

What I do claim as my invention and desire to secure by Letters Patent is:

In a friction clutch, the combination of a driven member, a driving member, a flexible friction band attached at one end to the driven member and arranged in a coil around the driving member, a clutch comprising a relatively free member and a relatively fast member, a pulley at the free end of the friction band, a pulley mounted on the driven member, and a cord-like member having its ends attached to the driven member and the free clutch member and having its intermediate portion engaged on opposite sides of the said pulleys.

Signed at Gottenborg, Sweden.

PAUL WILHELM SIEURIN.

Witnesses:
 A. W. ENANDER,
 S. E. SMALLMAN.